UNITED STATES PATENT OFFICE.

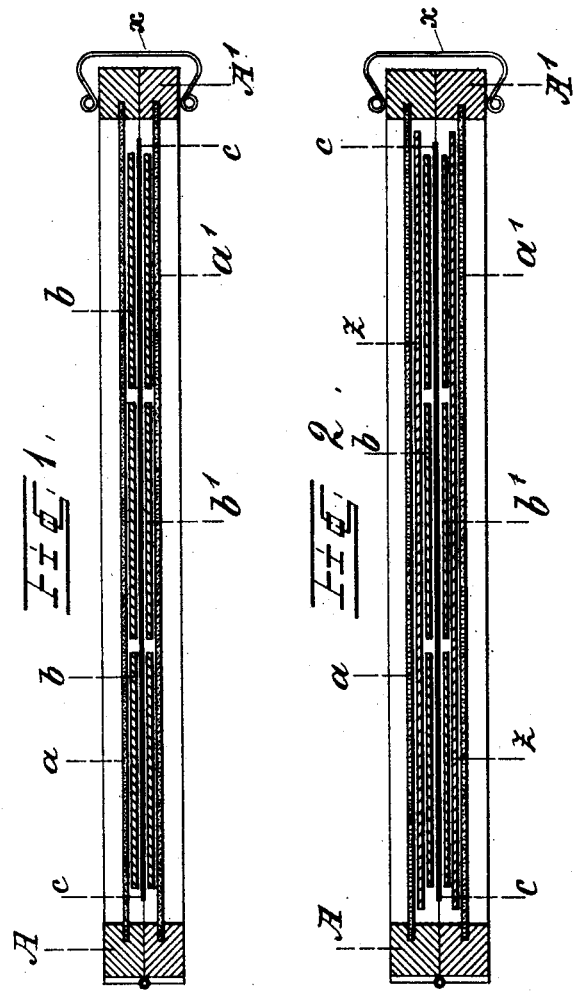

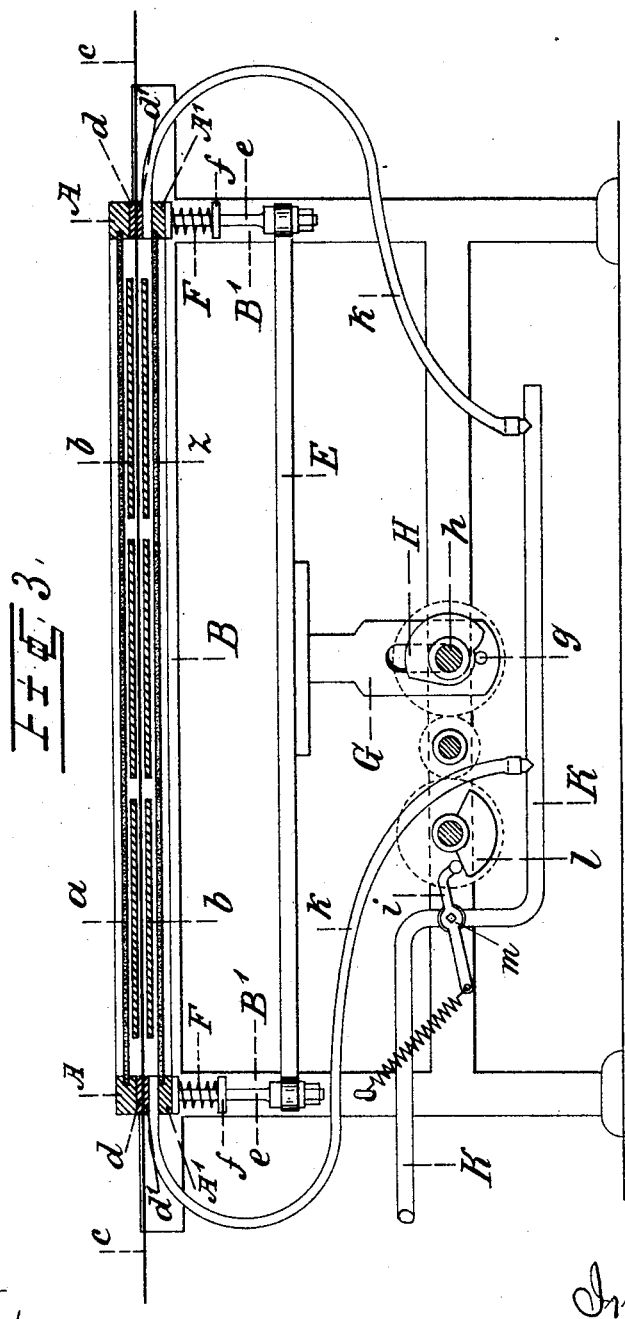

ARTHUR SCHWARZ, OF BERLIN, GERMANY.

PHOTOGRAPHIC-PRINTING APPARATUS.

SPECIFICATION forming part of Letters Patent No. 601,882, dated April 5, 1898.

Application filed April 12, 1897. Serial No. 631,767. (No model.)

*To all whom it may concern:*

Be it known that I, ARTHUR SCHWARZ, a subject of the German Emperor, residing at Berlin-Schöneberg, Germany, have invented certain new and useful Improvements in Photographic-Copying Apparatus, of which the following is a specification.

When photographic paper sensitized on both sides is being used for making copies of pictures, it is important that the pictures on one side register as much as possible with those on the other side, unless very heavy paper is being used, which would, however, imply the partial loss of the advantage of using paper sensitized on both sides.

I have devised a copying frame or machine assuring the exact registering of the pictures and in which the sensitized paper is exposed simultaneously at the same spot on both sides.

I have illustrated the new copying or exposure apparatus in the annexed drawings, making a part of this specification, and wherein—

Figures 1 and 2 show sectional views of flat copying-frames embodying my improvement. Fig. 3 shows in elevation, partly in section, a continuously-acting flat copying apparatus of my invention.

The exposure apparatus shown in Fig. 1 presents two superposed flat copying-frames A and A', in which the glass plates $a$ and $a'$ are supported and hinged together in any suitable manner. One series of negatives $b$ is attached to the plate $a$ and a second series $b'$ to the plate $a'$.

The paper $c$, sensitized on both sides, is placed between the negatives $b$ and $b'$, care being taken, of course, that the two glass plates $a$ and $a'$ be arranged exactly parallel to each other in the frames A and A'. The combined thicknesses of the negatives $b$ and $b'$ and of the sensitized paper $c$ must be of a sufficient size so that when the frames A A' are pressed together by clamps $x$ or other suitable devices the negatives will be closely and firmly pressed against the sensitized paper.

If the negatives $b$ $b'$ and the sensitized paper $c$ do not present the required thickness to obtain the necessary pressure when the frames are clamped together, a transparent or translucent plate $z$, of celluloid or other suitable material, may be placed under one or both of the glass plates, so as to obtain the necessary pressure, Fig. 2. In this case the negatives must of course be attached to the transparent plates $z$ and not to the glass plates, so as to prevent unclearness in the copies.

If air-pressure is employed to press the negatives against the sensitized paper, as usual in the pneumatic copying apparatus, the second glass plate $a'$ is eliminated and is displaced by a celluloid plate $z$, as shown in Fig. 3.

This apparatus is a continuously-operating one and is used for the wholesale production of copies.

The frame A, carrying the glass plate $a$, is fixed upon the table-board B and is equipped at its edges with closing-rims $d$. A similar frame A', with closing-rims $d'$ and provided with a celluloid plate $z$ instead of the glass plate, is movably arranged under the frame A, so that it can be raised or lowered at will. To this end the frame A' is connected to the rod E, provided with lateral guiding-pins $e$ passed through eyes $f$, connected to the supports B'. Springs F are mounted on these guiding-pins $e$ between the rings and the frame A'.

Now when the frame A' is lowered, together with the rod E and the slide G, provided with stud $g$, coöperating with the driving-shaft $h$ and the crank-disk H, mounted thereon, the sensitized paper $c$ can be fed in the double frames A A' between the negatives $b$ $b'$. If the crank-disk H has rotated far enough to release the stud $g$, the springs F will push the frame A' upward and the rims $d$ $d'$ will form with the sensitized paper $c$ an air-tight closure. At this moment the driving-shaft $h$ has caused, through a suitable gear, the crank-disk $l$ to turn so far as to release a spring-actuated lever $i$, sliding on the circumference of its segment, whereby a cock $m$ is opened, arranged in the suction-pipe $k$, communicating with a continuously-operating air-pump or a vacuum-tank. The air in the space between the sensitized paper and the flexible plate $z$ is exhausted at once, and the atmospheric pressure pushes this plate, with the negatives attached thereto, against the sensitized paper $c$ and said paper against the negatives $b$, attached to the glass plate. Now if the light is admitted above and below through the transparent plates by means of suitably-arranged electric lamps the paper is exposed on both sides, and as the arrangement enables the operator, before the sensitized paper is fed, correctly to ascertain the position of the upper and lower negatives and whether they register it is absolutely sure that after the exposure the copies of the pictures on both sides of the paper will register.

Having now described my invention, what I claim, and desire to secure by Letters Patent, is—

1. In a copying-frame, the combination of a rigid translucent plate at one side of the frame, a flexible transparent plate at the other side, to expose to the light on both sides of the frame photographic paper sensitized on both sides and insure the register of upper and lower negatives, said plates being arranged to leave a space between the two plates for the passage of the sensitized paper, and an air-exhauster communicating with said space, substantially as and for the purposes described.

2. In a copying-frame, the combination of a rigid upper frame, a movable lower frame, springs exerting an upward pressure on the lower frame, means for moving the lower frame against the pressure of said spring for the insertion of the paper and comprising a bar extending across the lower frame beneath the same and connected by upwardly-extending arms to the lower frame at opposite ends thereof, and means for releasing the lower frame to permit the springs to close the same against the upper frame, substantially as and for the purposes described.

3. In a copying-frame, the combination of a stationary frame and a movable frame adapted to be brought together and leave a space between them, springs for closing one frame against the other, a cam actuating the movable frame to periodically draw it from the other against the influence of said springs, a valve-controlled air-exhaust in communication with the space between the two frames, and means for automatically actuating the valve in the air-exhaust after the frames have been brought together for the purpose of exhausting air from the space between the frames, substantially as set forth.

In witness whereof I have hereunto set my hand in presence of two witnesses.

ARTHUR SCHWARZ.

Witnesses:
HENRY HARPER,
W. HAUPT.